April 11, 1933.  B. F. TURNER  1,903,581
VALVE LOCK AND HOUSING
Filed June 14, 1932
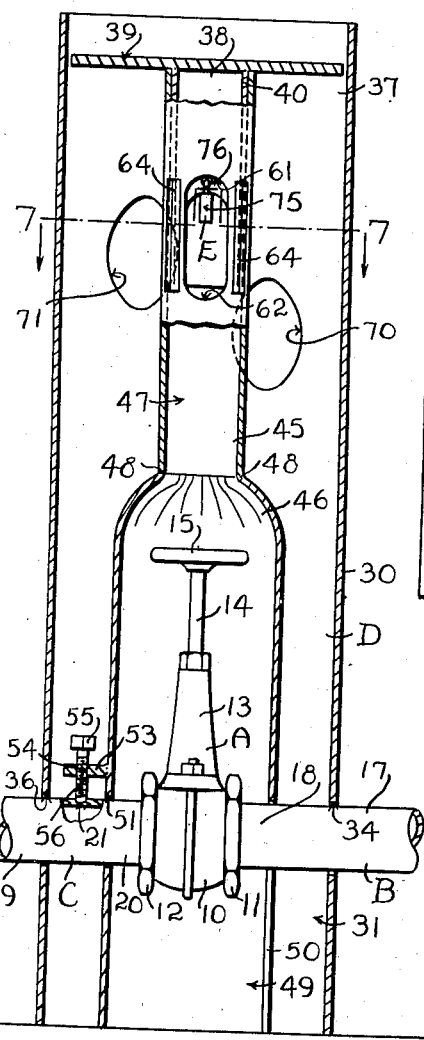
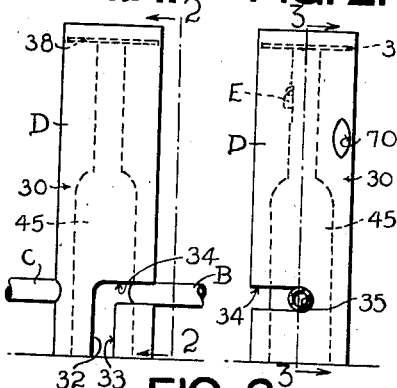
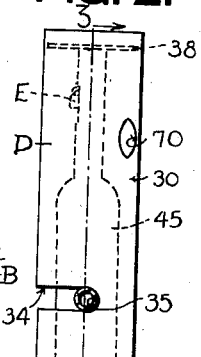
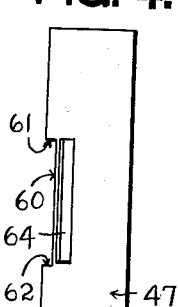
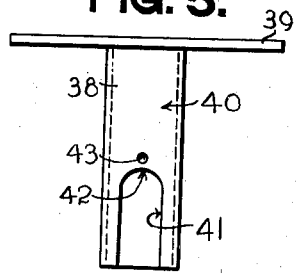
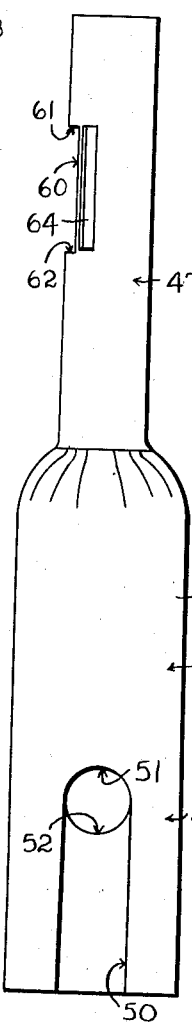
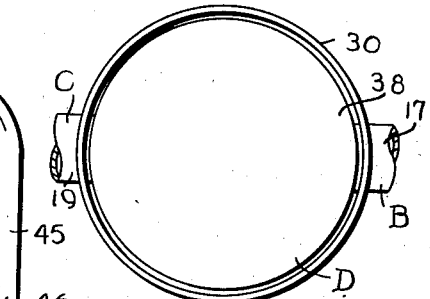
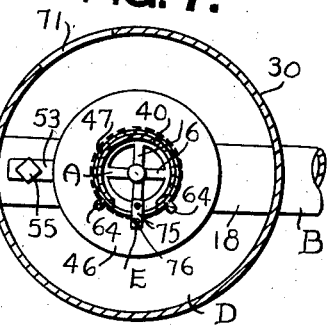
INVENTOR.
Barry F. Turner
BY Lancaster, Allwine and Rommel
ATTORNEYS.

Patented Apr. 11, 1933

1,903,581

UNITED STATES PATENT OFFICE

BARRY F. TURNER, OF HOLDENVILLE, OKLAHOMA, ASSIGNOR TO PHILLIPS PETROLEUM COMPANY, OF BARTLESVILLE, OKLAHOMA, A CORPORATION

VALVE LOCK AND HOUSING

Application filed June 14, 1932. Serial No. 617,197.

This invention relates to protectors or housings for rendering valves and the like tamper-proof.

The primary object of the invention is to provide such a device, in which the locking means is wholly within the housing.

Another object is to incorporate in such a device locking means which is located so that the lock thereof cannot be reached by implements generally employed in breaking locks.

Another object is to so locate the locking means that the lock thereof will be in a position which will render it practically proof against picking.

Still another object is to provide a device of this kind having means to prevent the unauthorized uncoupling of the valve structure from its associated pipe line, or the uncoupling of an auxiliary pipe or pipes such as outlet connections, leading from the valve structure exteriorly of the housing.

Another object is to provide in a device of this kind a rugged two-piece main housing, and with the entire device containing no hinges nor parts likely to be easily broken or rendered weak by rust and the like.

Still another object is to provide a tamper-proof housing for valves and the like which is of relatively small size but which will accommodate gate or other large size valves.

Another object is to provide such a device, the weight of which is not carried by the valve.

Yet another object is to provide a tamper-proof protector or housing for valves and the like, which is particularly strong and rugged but economical to manufacture.

Still another object is to provide a protector or housing of this kind which will shield the enclosed valve from the elements and the like.

Other objects and advantages of this invention will be apparent during the course of the following detailed description, taken in connection with the accompanying drawing forming a part of this specification and in which drawing:

Figure 1 is an elevation of the improved protector or housing set up about a valve.

Figure 2 is a view on the line 2—2 of Figure 1.

Figure 3 is an enlarged vertical sectional view on the line 3—3 of Figure 2.

Figure 4 is an elevation of an inner or minor housing member of the improved housing.

Figure 5 is an elevation of a lid or cover portion of the improved housing.

Figure 6 is a top plan view of the improved housing with the lid in place.

Figure 7 is a transverse sectional view on the line 7—7 of Figure 3.

In the drawing the letter A may generally designate a valve, B a pipe line connection to a source of supply, C an outlet pipe line, D the improved protector or housing and E a lock.

The valve A may be any conventional valve or similar means to regulate the flow of fluid and in the example shown, the valve is a conventional gate valve provided with the ordinary valve body 10 having opposite screw ends 11 and 12, an elongated bonnet 13, stem 14 and hand wheel 15 having the usual spaced apart spokes 16.

The pipe line connection B may comprise an ordinary pipe or conduit 17 leading from a source of supply (not shown), this pipe 17 being connected at one end 18 by means of screw threads or otherwise to the end 11 of the valve body 10.

Regarding the outlet pipe line C, this may include an ordinary pipe or conduit 19, connected at one end 20 by means of screw threads or otherwise to the end 12 of the valve body 10. This pipe 19 may be tapped, forming a socket or recess as at 21 adjacent its end 20 for a purpose later set out in detail.

In the example shown, the valve A and pipes B and C are located adjacent the ground, but it should be understood that the device may be employed to protect valves otherwise located.

As for the improved protector or housing D, the same includes an elongate main housing member 30, preferably tubular and of metal such as, for example, a portion of an ordinary ten inch oil well casing. This housing member 30 is provided at its pipe engaging end 31 with a bayonet slot 32, one arm 33 of the slot opening at the end 31 of the housing member 30 and extending longitudinally of the same while the opposite or circumferentially extending arm 34 extends approximately 90° about the circumference of the housing member and has its inner end 35 rounded to accommodate the pipe 17 while the general width of the bayonet slot is the same as or slightly larger than the exterior diameter of the pipe 17. Located opposite the inner end 35 of the bayonet slot 32 is a preferably circular opening 36 in the wall of the housing member 30 having a diameter the same as or slightly larger than the exterior diameter of the pipe 19.

The opposite or removable closure end 37 of the housing member 30 is provided with a removable lid or closure 38 preferably including a substantially flat disc 39 of boiler plate, which fits within the tubular housing member as shown in Figures 3 and 6. Welded or otherwise secured concentric with the disc 39 is a depending tubular extension 40 and projecting longitudinally or discward from the free extremity of the extension is a slot 41 which may be rounded off at its inner end as shown at 42. Adjacent this rounded inner end and on the prolongation of the longitudinal medial line of the slot 41 is an aperture 43. The object of the slot 41 and aperture 43 will be later explained. The extension 40 may, for example, be formed from a length of ordinary two and one-half inch pipe.

Within the main housing member 30 is a minor or auxiliary housing member 45 which includes a dome portion 46 enclosing the valve A and a tubular extension or sleeve 47 at the upper end of the dome portion. The walls of the housing member 45 are spaced apart from the walls of the housing member 30 as shown in Figures 3 and 7 and the total length of the housing member 45 is preferably slightly less than that of the housing member 30. In the construction of the housing member 45, the dome portion may comprise, for example, a length of six inch pipe swaged at one end to permit a three inch pipe, comprising the extension 47, to be welded as at 48 or otherwise suitably secured thereto.

At the pipe engaging end 49 of the dome portion 46 is a longitudinally extending slot 50 of a length substantially that of the arm 33 of the bayonet slot 32 and with its inner end rounded as at 51 to fit the pipe 17, the width of the slot 50 being substantially that or slightly larger than the external diameter of the pipe 17. Opposite the slot 50 and with its axis substantially the same as and coinciding with that of the arc defining the rounded end of the slot 50, is an aperture 52 to accommodate the pipe 19. Spaced above the aperture 52 is a radially extending arm 53 welded or similarly well secured to the outer surface of the dome portion 46. This arm 53 is provided with a screw threaded aperture 54 so that a set screw 55 or the like may be threaded therein with the free end of the shank 56 of the screw disposed in the recess or socket 21 of the pipe 19.

The tubular extension 47 is provided with a longitudinally extending slot 60 of substantially the same width as the slot 41 of the closure 38. This slot is so positioned that when the tubular extension 40 is telescoped within the tubular extension 47, and the disc 39 rests upon the free end of the tubular extension 47, the upper rounded end 61 will be slightly above the aperture 43 and the opposite or lower rounded end 62 will be somewhat below the free end of the tubular extension 40. Along both vertical sides of the slot 60 are elongate projections, ridges or guards 64 which extend radially from the outer wall of the tubular extension 47 and may be welded thereon.

By an inspection of Figure 3, it will be seen that a pair of apertures or hand holes 70 and 71 are provided in the wall of the main housing member 30 and are so related to the auxiliary or minor housing member 45 that the slots 41 and 60 are on the wall of the housing member 45 opposite to the wall of that housing facing the wall of the housing member 30 containing the hand holes, so that a person looking thru the hand holes will not see the slots 41 and 60 neither will a line drawn from the periphery of either of the hand holes 70 and 71 and touching the outer periphery of the tubular extension 47, pass thru or touch said slots. The hand holes are also so positioned, one spaced from and above the other, that a right hand and wrist may be inserted into the hole 71 and a left hand and wrist into the hole 70 and the hands will then be in a convenient position to reach around the tubular extension 47 and manipulate a lock, later described, carried by the tubular extension 40. These hand holes will also permit the fingers to be engaged with the free end of the tubular member 40 to raise the closure 38 if desired.

The lock E may be an ordinary padlock 75, the shackle 76 of which is inserted thru the aperture 43 and when locked, the padlock will hang suspended half within and half without the tubular members 40 and 41 as shown in Figure 7.

In assembling the protector or housing, the valve A being closed, the pipe 19 is uncoupled and the minor housing member 45 is placed over the valve with the pipe 17 accommodated in the slot 50. The main housing 30 is then placed over the minor housing 45, the pipe 17 being accommodated in the longitudinal arm of the bayonet slot 32 and housing 30 is finally rotated thru 90° to dispose the pipe 17 in the closed end of the arm 34 of the bayonet slot. The pipe 19 may now be inserted into the apertures 36 and 51 and coupled to the valve with the socket or recess 21 aligning with the aperture 54 in the extension 53. The set screw 55 may then be screwed down into the recess 21. Thus, it can be readily seen, the pipe 19 cannot be turned to uncouple it from the valve nor to uncouple the valve from the pipe 17, and the minor housing 45 will be held against movement. Since the pipe 17 is coupled to the source of supply it cannot be readily uncoupled, as is obvious. However, if desired, a similar projection and set screw could be provided for securing this pipe in a similar manner if considered necessary.

After the main housing is in place, the closure 38 may be positioned as heretofore brought out and locked by inserting a hand carrying the open padlock into one of the hand holes 70 or 71, inserting the shackle 76 thru the aperture 43 and closing the padlock. This can be done with one hand if desired.

If it is considered expedient, the protector housing may be placed on a concrete foundation rather than on the ground, or concrete can be flowed into the lower part of the device thru the slots 32 and 50. However, it is apparent that due to the diameters of the pipes 17 and 18 and the bulk of the valve, with respect to the housing, it would be impossible to dig under the device and manipulate the valve.

When it is desired to draw off fluid thru the valve, the operator, holding the key in one hand inserts his hands into the hand holes 70 and 71 and reaches about the inner housing so that he may hold the padlock to steady it with one hand and insert the key with the other. Withdrawing the padlock, he may either raise the closure 38 as heretofore suggested or insert some suitable tool under the disc 39 from the top of the housing in order to raise the closure. Finally he may insert a suitable implement such as the one commonly known as a "frog sticker" or spanner wrench (not shown) from the top of the inner housing and manipulate the hand wheel 15 of the valve.

It is apparent from Figure 7 and the statement heretofore made that it would be impossible to insert a straight implement into either or both of the hand holes to break the lock. Because of the elongate ridges or guards 64 and the limited space, it is also impossible to insert a tool, such as a bolt cutter, thru the hand holes to cut the shackle of the lock.

From the foregoing, it is apparent that a novel device has been provided which may be placed about a valve either in an isolated place such as along a pipe line, in connection with gas or oil storage tanks, or any place where it is desired to render the valve tamper-proof.

Because the locking means is wholly within the housing and concealed, not only is the valve protected by the housing, but the lock too is well protected from the elements and from tampering.

Various changes in detail may be made to the form of invention herein shown and described without departing from the spirit of the invention or the scope of the claims.

What is claimed is:

1. In a protector for valves, a housing having an opening for the insertion of means to unlock the housing and locking means for the housing wholly within the housing and concealed from the view of a person looking into said opening.

2. In a protector for valves, a housing and locking means for the housing wholly concealed from the view of a person looking into the locked housing.

3. In a protector for valves, a main housing including a lid therefor, a minor housing within the main housing, and means carried by the lid and minor housing positioning the lid to close the main housing.

4. In a protector for valves, a main housing including a removable closure therefor, said closure provided with an inwardly extending hollow extension, and a minor housing within the main housing enclosing a valve and provided with a hollow extension at an end thereof, said hollow extensions telescoping one within the other and carrying said closure in a position to close said main housing.

5. In a protector for valves, a main housing including a removable closure therefor, said closure provided with an inwardly extending hollow extension, and a minor housing within the main housing enclosing a valve and provided with a hollow extension at an end thereof ending close adjacent the mouth of said main housing, said hollow extensions telescoping one within the other and carrying said closure in a position to close the mouth of said main housing.

6. In a protector for valves, a main housing including a closure therefor, a minor housing within the main housing and spaced from the walls thereof, and locking means carried by the closure and minor housing to close the main housing.

7. In a protector for valves, a main housing having a hand hole in a wall thereof, said housing provided with a removable lid, a minor housing within the main housing and spaced from the walls thereof, and means to lock the lid, carried by said lid and minor housing with the minor housing between the locking means and the portion of the walls of said main housing containing said hand hole.

8. In a protector for valves, a main housing provided with a removable lid having a depending portion slotted longitudinally at its free end and an aperture adjacent the closed end of said slot, a minor housing within the main housing, spaced from the walls thereof and enveloping a valve, said minor housing provided with a sleeve portion receiving said depending portion, said sleeve portion having a longitudinal slot adjacent its free end, said last named slot longer than said first named slot and extending to said aperture when the longitudinal axes of said slots substantially align, and a padlock with the shackle thereof in said aperture and the body thereof in said slots.

9. In a protector for valves, a main housing having a hand hole in a wall thereof, said housing provided with a removable closure, a minor housing within the main housing and spaced from the walls thereof, and locking means to lock the closure in position at the mouth of said main housing, said locking means carried by the minor housing and closure in a position out of the line of vision thru said hand hole.

10. In a protector for valves, a housing provided with an outwardly projecting elongate sleeve portion having a longitudinal slot adjacent its free open end, means securing the housing about a valve, a removable closure for the housing having an elongate depending portion slotted longitudinally at its free end and provided with an aperture adjacent the closed end of said slot, said sleeve portion receiving said depending portion with the slots substantially aligning longitudinally, with the aperture uncovered and close adjacent an end of said first mentioned slot, and a removable stop in said aperture preventing longitudinal movement of said depending portion.

11. In a protector for valves, a housing provided with an outwardly projecting elongate sleeve portion having a longitudinal slot adjacent its free open end, means securing the housing about a valve, a removable lid for the housing having an elongate depending portion slotted longitudinally at its free end and provided with an aperture adjacent the closed end of said slot, said sleeve portion receiving said depending portion with the lid resting upon the free open end of said sleeve portion and with the slots substantially aligning longitudinally, with the aperture uncovered and close adjacent an end of said first named slot, and a removable stop in said aperture preventing longitudinal movement of said depending portion toward the free end of said sleeve.

12. In a protector for a valve provided with pipe connections, a housing enclosing said valve having a bayonet slot in its wall at an end thereof accommodating one of said pipe connections upon partial rotation of said housing, and an aperture in the wall thereof accommodating another of said pipe connections.

13. In a protector for a valve provided with a removable pipe connection thereto, a housing enclosing said valve provided with an aperture accommodating said pipe connection, and means carried by said housing preventing the removal of said pipe connection from said valve.

14. In a protector for a valve provided with a removable pipe connection thereto, a housing enclosing said valve provided with an aperture accommodating said pipe connection, and means within said housing preventing the removal of said pipe connection from said valve.

15. In a protector for a valve provided with a removable pipe connection thereto, a main housing provided with an aperture thru which the pipe connection extends exteriorly of said housing, a minor housing within said main housing and enclosing said valve provided with an aperture thru which said pipe connection extends exteriorly of said minor housing, an arm carried by said minor housing and means carried by said arm bearing against said pipe connection detachably holding it against removal.

16. In a protector for valves, a main housing having a hand hole in a wall therefor, said housing provided with a removable closure, a minor housing within the main housing and spaced from the walls thereof, said minor housing provided with a pair of spaced apart longitudinally extending guard projections on the walls thereof farthest removed from said hand holes, and locking means to lock the closure in position at the mouth of said main housing, said locking means carried between said guard projections.

17. In a protector for valves, a main housing having a hand hole in a wall thereof, said housing provided with a removable closure, a minor housing within the main housing and spaced from the walls thereof, said minor housing provided with a pair of spaced apart longitudinally extending guard projections on the wall thereof substantially farthest removed from said hand holes, and locking means to lock the closure in position at the mouth of said main housing, said locking means carried by the minor housing and closure between said guard projections and in a position out of the line of vision thru said hand hole.

BARRY F. TURNER.